US010046743B2

(12) United States Patent
Jonasson et al.

(10) Patent No.: US 10,046,743 B2
(45) Date of Patent: Aug. 14, 2018

(54) SECONDARY STEERING SYSTEM UNIT, SECONDARY STEERING SYSTEM, VEHICLE AND A METHOD FOR SECONDARY STEERING

(71) Applicant: VOLVO CAR CORPORATION, Gothenburg (SE)

(72) Inventors: Mats Jonasson, Partille (SE); Mikael Thor, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 156 days.

(21) Appl. No.: 15/139,413

(22) Filed: Apr. 27, 2016

(65) Prior Publication Data

US 2016/0325721 A1    Nov. 10, 2016

(30) Foreign Application Priority Data

May 5, 2015    (EP) ..................... 15166329

(51) Int. Cl.
*B60T 8/24* (2006.01)
*B62D 9/00* (2006.01)
(Continued)

(52) U.S. Cl.
CPC ............... *B60T 8/246* (2013.01); *B60T 7/12* (2013.01); *B60T 8/171* (2013.01); *B60T 8/172* (2013.01);
(Continued)

(58) Field of Classification Search
None
See application file for complete search history.

(56) References Cited

U.S. PATENT DOCUMENTS 5,348,334 A * 9/1994 Giltinan .................. B60G 3/20
280/124.138
6,116,626 A * 9/2000 Cherry .................. B60G 7/001
188/329

(Continued)

FOREIGN PATENT DOCUMENTS

DE    102008046007 A1    3/2010
GB        2383983 A    7/2003

OTHER PUBLICATIONS

Extended European Search Report Dated Oct. 27, 2015, Application No. 15166329.1-1756, Applicant Volvo Car Corporation, 7 Pages.

*Primary Examiner* — Truc M Do
(74) *Attorney, Agent, or Firm* — Brooks Kushman P.C.

(57) ABSTRACT

A vehicle, a method, a secondary steering system unit and a secondary steering system are provided. The secondary steering system unit comprises: a fault determination arrangement arranged to determine the presence of a fault in the main steering system and a path controller arranged to generate an upcoming path for the host vehicle. The secondary steering system unit is arranged to steer the host vehicle along the path by differential braking upon determination that a fault is present in the main steering system. Furthermore, the secondary steering system is arranged to control the differential braking in dependence of both a yaw torque acting on the host vehicle as a result of the differential braking and a steering angle resulting from a generated alignment torque on a braked steerable wheel caused by the associated wheel suspension scrub radius.

15 Claims, 4 Drawing Sheets

(51) Int. Cl.
  *B60T 8/1755*  (2006.01)
  *B62D 15/02*  (2006.01)
  *B60T 7/12*  (2006.01)
  *B60T 8/171*  (2006.01)
  *B60T 8/172*  (2006.01)
  *B62D 5/04*  (2006.01)
  *B62D 6/00*  (2006.01)

(52) U.S. Cl.
  CPC ........ *B60T 8/17557* (2013.01); *B62D 5/0481* (2013.01); *B62D 6/003* (2013.01); *B62D 9/005* (2013.01); *B62D 15/025* (2013.01); *B60T 2201/083* (2013.01); *B60T 2210/32* (2013.01); *B60T 2260/02* (2013.01); *B60T 2260/06* (2013.01); *B60T 2270/402* (2013.01)

(56) References Cited

U.S. PATENT DOCUMENTS

| | | | | |
|---|---|---|---|---|
| 6,672,985 | B2* | 1/2004 | Chung | B60K 17/046 180/24.03 |
| 6,890,039 | B2* | 5/2005 | Chung | B60B 11/00 301/36.2 |
| 9,592,850 | B1* | 3/2017 | Kataoka | B62D 1/286 |
| 9,669,869 | B2* | 6/2017 | Kageyama | B62D 7/18 |
| 2001/0039901 | A1* | 11/2001 | Hossfield | B62D 1/265 104/130.07 |
| 2002/0001076 | A1* | 1/2002 | Jackson | G01B 5/0025 356/139.09 |
| 2004/0135431 | A1* | 7/2004 | Sekine | B60T 7/042 303/140 |
| 2005/0041239 | A1* | 2/2005 | Healy | G01B 11/2755 356/139.09 |
| 2005/0267683 | A1* | 12/2005 | Fujiwara | B60T 8/17558 701/301 |
| 2006/0006623 | A1* | 1/2006 | Leclair | B62D 7/18 280/93.512 |
| 2006/0080015 | A1* | 4/2006 | Voeller | G01L 321/26 701/41 |
| 2006/0174501 | A1* | 8/2006 | Harrill | B60G 3/26 33/288 |
| 2007/0256868 | A1* | 11/2007 | Romig | A01D 34/008 180/6.5 |
| 2007/0260370 | A1* | 11/2007 | Romig | A01D 34/008 701/23 |
| 2009/0031782 | A1* | 2/2009 | Jackson | G01B 11/2755 73/1.75 |
| 2010/0030426 | A1* | 2/2010 | Okita | B60T 7/22 701/41 |
| 2011/0246040 | A1* | 10/2011 | Nakayama | B60T 8/17557 701/70 |
| 2011/0276227 | A1* | 11/2011 | Sugawara | B60T 7/042 701/41 |
| 2012/0041660 | A1* | 2/2012 | Killian | B60T 8/173 701/70 |
| 2012/0101701 | A1* | 4/2012 | Moshchuk | B60W 10/184 701/70 |
| 2012/0101713 | A1* | 4/2012 | Moshchuk | B60W 10/184 701/301 |
| 2012/0226417 | A1 | 9/2012 | Nishikawa | |
| 2013/0030651 | A1* | 1/2013 | Moshchuk | G08G 1/166 701/41 |
| 2013/0245890 | A1* | 9/2013 | Kageyama | B62D 7/18 701/41 |
| 2014/0008141 | A1* | 1/2014 | Kageyama | B62D 5/00 180/400 |
| 2015/0151778 | A1* | 6/2015 | Kageyama | B60G 3/20 701/41 |
| 2015/0353079 | A1* | 12/2015 | Suzuki | B60T 8/1755 701/43 |

* cited by examiner

SECONDARY STEERING SYSTEM UNIT, SECONDARY STEERING SYSTEM, VEHICLE AND A METHOD FOR SECONDARY STEERING

CROSS-REFERENCE TO RELATED APPLICATIONS

This application claims foreign priority benefits under 35 U.S.C. § 119(a)-(d) to European patent application number EP 15166329.1, filed May 5, 2015, which is incorporated by reference in its entirety.

TECHNICAL FIELD

Embodiments herein relate to a secondary steering system unit and a secondary steering system. Embodiments herein further relate to a vehicle comprising a secondary steering system unit and/or a secondary steering system and to a method for secondary steering of a host vehicle.

BACKGROUND

Vehicles today are generally equipped with a steering system which allows a vehicle operator to steer vehicle wheels, and thereby the vehicle, by turning a steering wheel. Many vehicles, such as cars, are also provided with a steering assist system. Such a system may be referred to as power steering, power assisted steering (PAS) or electrical power assisted steering (EPAS). The steering assist system helps the vehicle operator in steering maneuvers by augmenting a steering effort of the steering wheel. Hydraulic or electric actuators thus add energy to the steering mechanism so the vehicle operator needs to provide less effort regardless of conditions.

An EPAS comprises an electric arrangement which provides an overlay torque to the steering system along with the torque the vehicle operator applies on the steering wheel. The overlay torque is usually strong enough to move a steering rack and turn wheels of the host vehicle without any steering wheel input from the vehicle operator. Therefore such an EPAS may be used for controlling steering also in autonomous vehicles. During autonomous driving the EPAS controls the desired front wheels steering angles without any steering wheel input from the vehicle operator.

If a steering actuator fault occurs when the host vehicle is operated autonomously, in the sense that the actuator is not capable of support steering actuation, the vehicle will not be controllable. One fault that could occur is a fault where the overlay torque will be zero, i.e., no actuation occurs at all. As a result, the vehicle will most likely not follow a road curvature and hence will depart from the road. Even if the vehicle operator notices the absence of steering support, it will in many cases take too long time for him/her to regain control in order to be able to avoid the road departure.

To fulfill system safety requirements redundant steering systems, i.e., double steering actuators may be used. However, such systems add complexity and cost to the steering system.

In US20130030651A1 differential braking is used to steer a vehicle such that an accident can be avoided. The collision avoidance system suggested in US20130030651A1 may be useful in some situations, but there remains a need for an improved and/or alternative secondary steering system unit.

SUMMARY

Embodiments herein aim to provide a secondary steering system unit, eliminating or at least reducing problems and/or drawbacks associated with prior art solutions and/or to provide an alternative secondary steering system unit.

According to an embodiment, this is provided by a secondary steering system unit for a host vehicle having autonomous steering capabilities comprising a main steering system comprising a steering actuator for providing an overlay torque to the steering system which is sufficient to steer at least one pair of host vehicle steerable wheels, the host vehicle further having a brake system comprising a respective wheel brake associated with a respective vehicle wheel which is suspended by a respective wheel suspension, the host vehicle further comprising one or more sensors and a communication arrangement for acquiring vehicle surrounding information, the secondary steering system unit comprising:

a fault determination arrangement, arranged to determine the presence of a fault in the main steering system, a path controller, arranged to generate an upcoming path for the host vehicle based on at least one of information received from the sensors and information received via the communication arrangement, the secondary steering system unit being arranged to steer the host vehicle along the upcoming path by activation of differential braking of at least one wheel brake upon determination that a fault is present in the main steering system, wherein the secondary steering system unit is arranged to steer the differential braking in dependence of both a yaw torque acting on the host vehicle as a result of the differential braking and a steering angle resulting from a generated alignment torque on a braked steerable wheel caused by the associated wheel suspension scrub radius.

Since the secondary steering system unit is arranged to steer the differential braking in dependence of both a yaw torque acting on the host vehicle as a result of the differential braking and a steering angle resulting from a generated alignment torque on a braked steerable wheel caused by the associated wheel suspension scrub radius, the upcoming path for the host vehicle can be followed when a fault in the main steering system has occurred. The yaw torque and the scrub radius can thus together be used for control of the host vehicle. Hereby differential braking involving braking of a single wheel can be used for the control of the vehicle. This allows vehicle control in an economically more efficient and less complex manner than if a pair of wheels simultaneously has to be controlled during the braking maneuver. However, in some applications scrub radiuses related to two differentially braked wheels can be used.

The scrub radius has proven to be an efficient tool for a lateral control of the host vehicle during the steering maneuver along the upcoming path. Hereby no double steering actuator or other redundant steering system has to be used when it is determined that a fault has occurred in the main steering system.

Embodiments herein also aim to provide a secondary steering system without the problems or drawbacks described above and/or to provide an alternative secondary steering system.

According to an embodiment, this is provided by a secondary steering system comprising host vehicle wheels, wheel suspension and wheel brakes, and wherein the secondary steering system comprises a secondary steering system unit according to embodiments described herein.

Since the secondary steering system comprises a secondary steering system unit according to embodiments described herein the system can be used for controlling a vehicle when the presence of a fault in the main steering system is determined. According to some embodiments the scrub radius is positive. With a positive scrub radius a relatively large lateral displacement of the host vehicle can be achieved during the differential braking. Hereby the path controller is allowed to more freely generate the upcoming path. Safety is thus enhanced since a "more optimal" path can be generated, i.e., a path which allows the host vehicle to come to a safe stop without interference with external objects or without road departure.

The magnitude of the scrub radius should be large enough, such that it contributes to the curvature, for controlling of the steering angle by braking one front wheel. By braking a front wheel, the vehicle's side motion is controlled by the induced yaw torque from the brake force and also the resulted front steering angle caused by scrub radius and the brake force.

According to some embodiments the scrub radius is at least 10 millimeters, preferably at least 20 millimeters, more preferably at least 30 millimeters.

Since the scrub radius is at least 10 millimeters, preferably at least 20 millimeters, more preferably at least 30 millimeters, lateral displacement of the host vehicle can be controlled in both a more free and a more distinct manner. If the scrub radius is too small the vehicle has a physical limitation in how large curvature that can be attained.

According to some embodiments the scrub radius is selected to be sufficiently large to cause a toe-out effect on a host vehicle wheel which is differentially braked. Since the scrub radius is selected to be sufficiently large to cause a toe-out effect on a host vehicle wheel which is differentially braked lateral displacement of the host vehicle can be controlled in both a more free and a more distinct manner. Differential braking of a wheel will thus cause the wheel to turn outwards, as seen in the driving direction. This effect provides a significant super positioned effect of the side-motion along with the yaw torque mentioned above.

According to some embodiments the wheel suspension comprises double wishbones.

With a wheel suspension of double-wishbone-type, a toe-out effect can be achieved in a relatively easy and efficient manner. In addition, the chassis and suspension can be designed such that different aspects e.g., related to a camber angle, a king pin angle, can be optimized. This also provides for a relatively stiff and efficient suspension.

According to some embodiments the scrub radius is negative or substantially zero. Since the scrub radius is negative or substantially zero, the design of the steering system and/or the wheel suspension can be designed more freely. If scrub radius is negative or substantially zero, the effect of the steering angle counteracts the side motion. The host vehicle will however turn due to the induced yaw torque caused by the differential braking. The curvature of the path will be moderate but sufficient in some applications.

According to some embodiments the system comprises a steering angle control arrangement which is arranged to keep a current steering wheel angle during differential braking. Since the system comprises a steering angle control arrangement which is arranged to keep a current steering wheel angle during differential braking the host vehicle can be efficiently controlled also with a scrub radius which is negative or substantially zero.

According to some embodiments the steering angle control arrangement comprises at least one of a friction element and a spring which is arranged to keep the current steering wheel angle during differential braking. Since the steering angle control arrangement comprises at least one of a friction element and a spring which is arranged to keep the current steering wheel angle during differential braking the determined path for the host vehicle can have an increased curvature compared with if no friction element and/or spring is present. The "inherent friction and/or force" in the steering system as a result of the at least one of a friction element and a spring will counteract a toe-in effect, i.e., the turning of the differentially braked steering wheel inwards as seen in the driving direction. In some applications a vehicle operator should still be able to manually take over control by using the steering-wheel, so friction force must allow the vehicle operator to turn the steering-wheel. The vehicle's side motion is then controlled by induced yaw torque solely from braking inner wheels. If the host vehicle is controlled towards a "right-direction", the inner wheels are the wheels on the right side of the host vehicle and vice versa.

Embodiments herein also aim to provide a vehicle without the problems or drawbacks described above and/or to provide an alternative vehicle.

According to an embodiment, this is provided by vehicle, wherein the vehicle comprises a secondary steering system unit or a secondary steering system according to embodiments described herein. Since the vehicle comprises a secondary steering system unit or a secondary steering system according to embodiments described herein the upcoming path for the host vehicle can be followed when a fault in the main steering system has occurred. The yaw torque and the scrub radius are thus together used for control of the host vehicle.

Thus, hereby is provided a vehicle, eliminating or at least reducing the problems and/or drawbacks associated with prior art solutions and/or to provide an alternative method for secondary steering.

Embodiments herein also aim to provide a method for secondary steering of a host vehicle without the problems or drawbacks described above.

According to an embodiment, this is provided by method for secondary steering of a host vehicle having autonomous steering capabilities, the host vehicle comprising a main steering system with a steering actuator for providing an overlay torque to the steering system which is sufficient to steer at least one pair of host vehicle steerable wheels, the host vehicle further having a brake system comprising a respective wheel brake associated with a respective vehicle wheel which is suspended by a respective wheel suspension, the host vehicle further comprising one or more sensors and a communication arrangement for acquiring vehicle surrounding information, the secondary steering system unit comprising a fault determination arrangement, arranged to determine the presence of a fault in the main steering system and a path controller, arranged to generate an upcoming path for the host vehicle based on at least one of information received from the sensors and information received via the communication arrangement, the secondary steering system unit being arranged to steer the host vehicle along the upcoming path by activation of differential braking of at least one wheel brake upon determination that a fault is present in the main steering system, characterized in that the method comprises:

steering, by the secondary steering system, the differential braking in dependence of a yaw torque acting on the host vehicle as a result of the differential braking and simultaneously, steering, by the secondary steering system, the differential braking in dependence of a steering angle resulting from a generated alignment torque on a braked steerable wheel caused by the associated wheel suspension scrub radius.

Since the method comprises controlling the differential braking in dependence of both a yaw torque acting on the host vehicle as a result of the differential braking and a steering angle resulting from a generated alignment torque on a braked steerable wheel caused by the associated wheel suspension scrub radius, the upcoming path for the host vehicle can be followed when a fault in the main steering system has occurred.

Thus, hereby is provided a method, eliminating or at least reducing the problems and/or drawbacks associated with prior art solutions.

BRIEF DESCRIPTION OF THE DRAWINGS

The various aspects of embodiments herein, including particular features and advantages, will be readily understood from the following detailed description and the accompanying drawings, in which.

DETAILED DESCRIPTION

As required, detailed embodiments are disclosed herein; however, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art. Furthermore, disclosed features of example embodiments may be combined as readily understood by one of ordinary skill in the art to which this application belongs. In addition, like numbers refer to like elements throughout.

Well-known functions or constructions will not necessarily be described in detail for brevity and/or clarity.

Figures 1A, 1B, 1C:
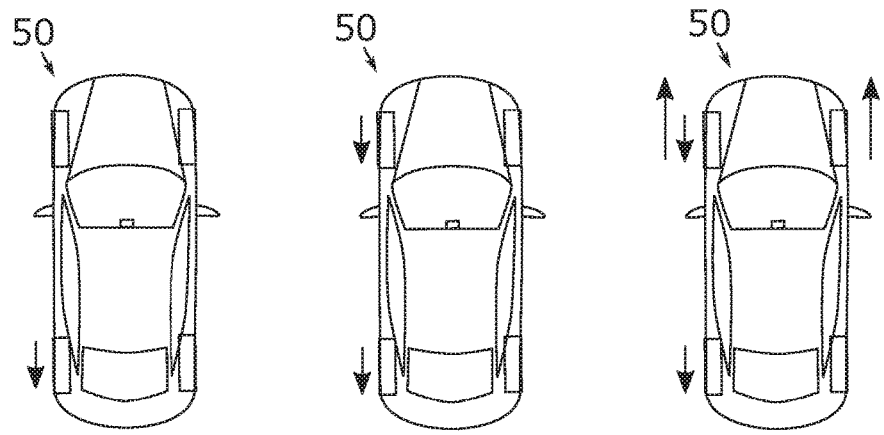
FIG. 1A illustrates differential braking according to some embodiments.
FIG. 1B illustrates differential braking according to some other embodiments.
FIG. 1C illustrates differential braking according to yet some other embodiments.

FIG. 1A illustrates a host vehicle 50 from above in a situation where a wheel brake, not shown, is activated on a rear left wheel of the vehicle 50. The braking is illustrated by an arrow representing a brake force between the rear left wheel and the ground. In FIG. 1A only the rear left wheel is braked. Activation of only one or some vehicle wheel brakes in order to generate a yaw torque on the host vehicle 50 is referred to as differential braking. When the rear left wheel is braked, the front part of host vehicle 50 will turn to the left in FIG. 1A as a function of the yaw torque.

FIG. 1B illustrates the host vehicle 50 when both the rear left wheel and the front left wheel are braked. Also this situation is referred to as differential braking, and the front of the vehicle 50 will turn to the braked side when wheel brakes are applied to the wheels on the left side. FIG. 1C resembles the FIG. 1B scenario, but here propulsion torque is acting on the front wheels. By using the combination of traction and/or braking different signs of longitudinal tire forces occur which implies that a curvature for the host vehicle can be increased. The deceleration of the host vehicle 50 will also be lower. According to some embodiments three wheels of the host vehicle 50 can be braked. When the longitudinal tire forces on the left and right side of the host vehicle 50 are different, a yaw torque is generated. If brake forces are different on left and right side, this is referred as differential braking.

Figure 2:
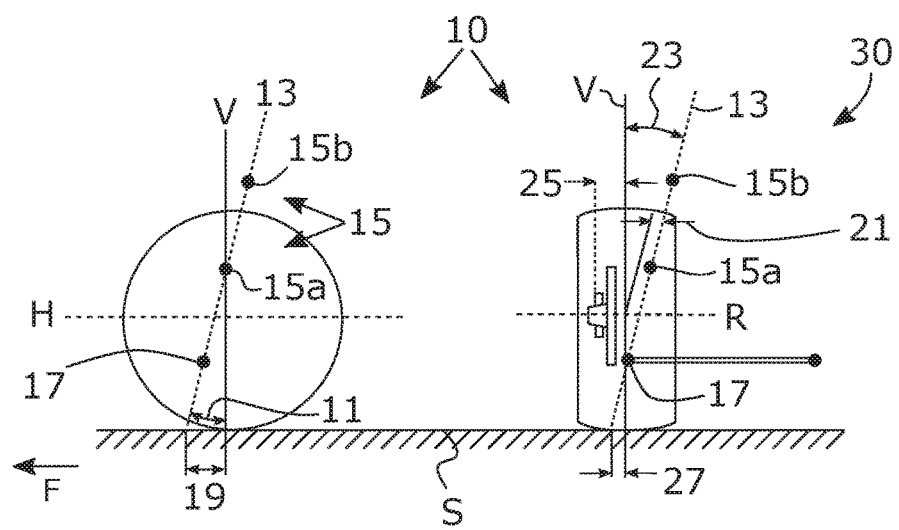
FIG. 2 illustrates a secondary steering system according to some embodiment.

FIG. 2 illustrates a vehicle wheel 10 and a host vehicle wheel suspension 30. The left part of FIG. 2 illustrates a side view of the wheel 10. The forward direction, i.e., the direction the wheel 10 is rolling on a surface S when the vehicle is driven on a road or similar, is indicated by the arrow F. A horizontal axis of wheel 10 is indicated with H, a vertical center axis is indicated with V and a rotation axis for the wheel is indicated with R.

In the left part of FIG. 2 is the Caster angle 11 illustrated. The caster angle 11 is the angle between the vertical axis V and a kingpin axis 13. The kingpin axis 13 may also be referred to as a steering axis or pivot axis. The kingpin axis 13 runs through the center of an upper ball joint 15 to the center of a lower ball joint 17. In FIG. 2 a first upper ball joint position 15a and a second upper ball joint position 15b are illustrated. In FIG. 2 a positive Caster angle is illustrated. Also a mechanical trail 19 is illustrated. The mechanical trail 19 is the distance between vertical center axis V and the intersection between the kingpin axis 13 and the ground.

In the right part of FIG. 2 the wheel 10 is illustrated as seen along the horizontal axis H. The first and second upper ball joint positions 15a, 15b are illustrated. In the right part of FIG. 2 also a spindle length 21, a kingpin inclination 23, and a wheel offset 25 are illustrated. A scrub radius 27 is illustrated. The scrub radius 27 is a distance in a front view, i.e., the FIG. 2 view, between the king pin axis 13 and a center of the contact patch of the wheel. The center of the contact patch of the wheel coincides with the vertical axis V. The scrub radius 27 illustrated in FIG. 2 is negative, i.e., it extends out from the vertical axis V.

Figure 3:
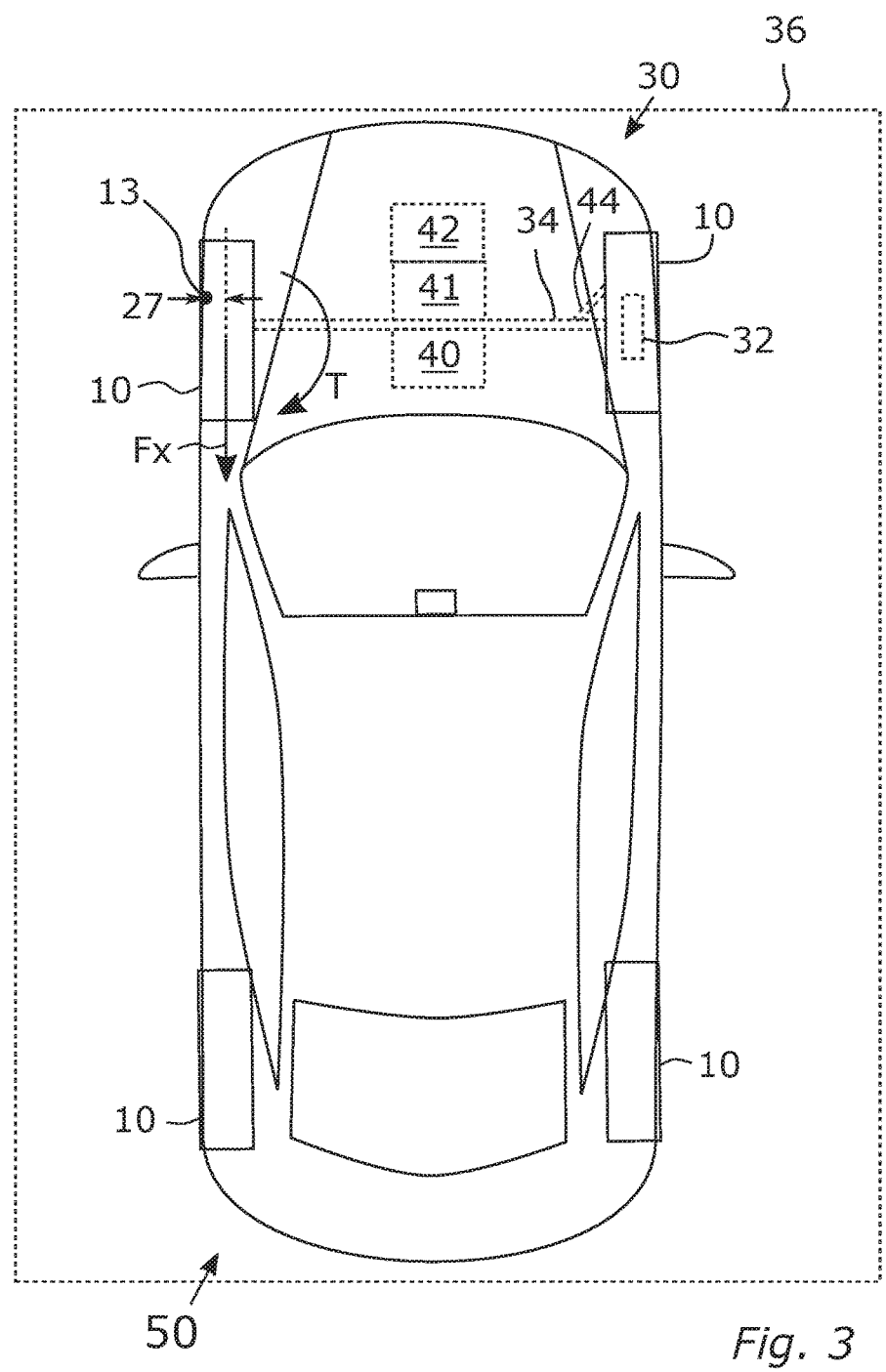
FIG. 3 illustrates a vehicle with a secondary steering system according to some embodiments.

FIG. 3 illustrates the host vehicle 50 with four wheels 10 and the wheel suspension 30. For the sake of clarity only one wheel brake 32 is illustrated, all wheels 10 can comprise wheel brakes 32, e.g., if disc-type and/or drum-type. Also a front axis 34 is illustrated. The host vehicle 50 comprises a main steering system which is arranged to allow a vehicle operator to steer the host vehicle 50 in a known manner.

The host vehicle 50 comprises a secondary steering system 36 arranged for differential braking of one or more of the wheel brakes 32. The secondary steering system 36 comprises a secondary steering system unit 40. The secondary steering system unit 40 can be arranged as a separate unit which is arranged to control the secondary steering system 36 of the vehicle 50. The secondary steering system unit 40 can also be arranged as an integrated part of the secondary steering system 36 of the vehicle 50.

A fault determination arrangement 41 is arranged to determine the presence of a fault in the main steering system of the host vehicle 50. A fault may be detected e.g., by a fault signal from the EPAS or a steer and/or diagnose-unit related to the EPAS. A fault can also be determined by a difference between a steering angle the host vehicle 50 is supposed to have and a steering angle the host vehicle 50 actual has. A fault can also be determined in other ways. For example a fault can be determined if the actual motion of the host vehicle 50 and/or the yaw rate are different from calculated values.

The secondary steering system unit 40 and/or other parts of the steering system 36 can comprise at least one processing unit that, as one skilled in the art would understand, may include one or more processors (e.g., one or more microprocessors, microcontrollers and/or programmable digital signal processors) and associated memory having software for controlling the one or more processors for use in performing the various functions and/or operations described herein. In some embodiments the one or more processing units are used for processing in several different vehicle systems. Some processing units may be dedicated to a specific processing task. The one or more processing units may be central processing units that carry out instructions of computer programs/software which when executed perform basic arithmetical, logical, and input/output operations.

In some embodiments the secondary steering system unit 40 is connected to a navigation system comprised in the host vehicle 50, to which a user can input a preferred host vehicle route. Such navigation system can comprise a positioning arrangement, which may determine a host vehicle position and heading. The positioning system can determine the host vehicle position and driving direction e.g., via a satellite based global positioning system or via map matching and a compass.

The host vehicle 50 can have autonomous steering capabilities. In such embodiments the host vehicle 50 comprises an autonomous drive arrangement, sensors and a communication unit. The host vehicle 50 may then be referred to as an autonomous vehicle. The autonomous drive arrangement allows the host vehicle 50 to be driven autonomously along a route or a road. The autonomous drive arrangement normally comprises an electrical/mechanical control arrangement, arranged to control steering and velocity of the host vehicle 50 at least partly based on information received from the sensors. The autonomous drive arrangement is connected to the main steering system, such that the autonomous drive arrangement, directly or indirectly, can control a direction of at least some of the wheels 10 of the host vehicle 50. Hereby e.g., a yaw rate of the host vehicle 50 can be adjusted, such that the driving direction of the host vehicle 50 is adjusted in accordance with the input from the autonomous drive arrangement. The autonomous drive arrangement is also connected to a host vehicle engine and a host vehicle braking system which comprises the wheel brakes 32.

Hereby the autonomous drive arrangement, directly or indirectly, can control acceleration and/or deceleration of the host vehicle 50. The autonomous drive arrangement can e.g., increase a host vehicle velocity by increasing the engine speed, and decrease the host vehicle velocity by motor-braking or by activation of one or more of the wheel brakes 32. The autonomous drive arrangement may e.g., be connected to an ABS (anti-lock braking system), such that one or more wheel brakes 32 can be activated selectively.

In some embodiments the host vehicle 50 comprises a number of vehicle subsystems which may provide some automatic- or semi-automatic drive functions. Examples of such subsystem are: adaptive cruise control systems, lane departure control systems, collision avoidance systems, traffic sign recognition systems, some communication systems, some navigation systems, ultrasonic sensor systems, infrared camera systems, inertial measuring systems, intelligent transportation systems, safe road train systems, automatic parking systems, etc.

The sensor or sensors of the host vehicle 50 can be one or more camera sensors, one or more radar sensors and/or one or more lidar-sensors. The sensors can be arranged at any position in/on the host vehicle 50 from where detection of a vehicle surrounding is possible.

The host vehicle 50 can further comprise a communication unit. The communication unit may comprise a receiver that receives signals from at least one external source, such as surrounding vehicles, and converts them to information, such as real time information relating to preceding vehicle velocity, acceleration, braking, lane selection, statuses, heading etc. The receiver may also be configured to communicate with external sources in form of infrastructure such as remote servers/the cloud, databases, and/or roadside units. The communication unit may also comprise a transmitter which converts real time host vehicle information, e.g., relating to host vehicle velocity, acceleration, braking, lane selection, statuses, heading etc. into a signal, such as an electrical signal and/or a signal carried by electromagnetic waves. Hereby host vehicle 50 information may be distributed to other vehicles and/or infrastructure such as remote servers/the cloud, databases, and/or roadside units. Any suitable means may be used for the communication between the host vehicle 50 and other vehicles or infrastructure, e.g., radio signals, such as according to either of standards, such as the GSM, 3G, LTE and/or WiFi standards, and/or satellite communication signals.

A path controller 42 is connected to the above described processing units, the sensors and/or the communication arrangement. Information received from the sensors and information received via the communication arrangement is thus provided to the path controller 42. The path controller 42 is arranged to generate an upcoming path for the host vehicle 50 based on sensor information and/or communicated information.

The generated upcoming path is a suitable path or trajectory that the host vehicle 50 should follow in order to come to a safe stop. When generating the path, care is thus taken to avoid any stationary or moving objects in front of the host vehicle 50. Care is also taken to the road on which the host vehicle 50 travels, and possibly also to a road environment near the road.

According to some embodiments the steering system 36 comprises a steering angle control arrangement 44 which is arranged to keep a current steering wheel angle during the differential braking. The steering angle control arrangement 44 comprises a friction element, an elastic element such as a pretension-spring or similar which is arranged to keep a current steering wheel angle during differential braking. With such a steering angle control arrangement 44 a larger curvature can be achieved, i.e., the host vehicle 50 can be steered to follow a generated path with smaller radius also when the scrub radius is negative or substantially zero.

Figure 4:
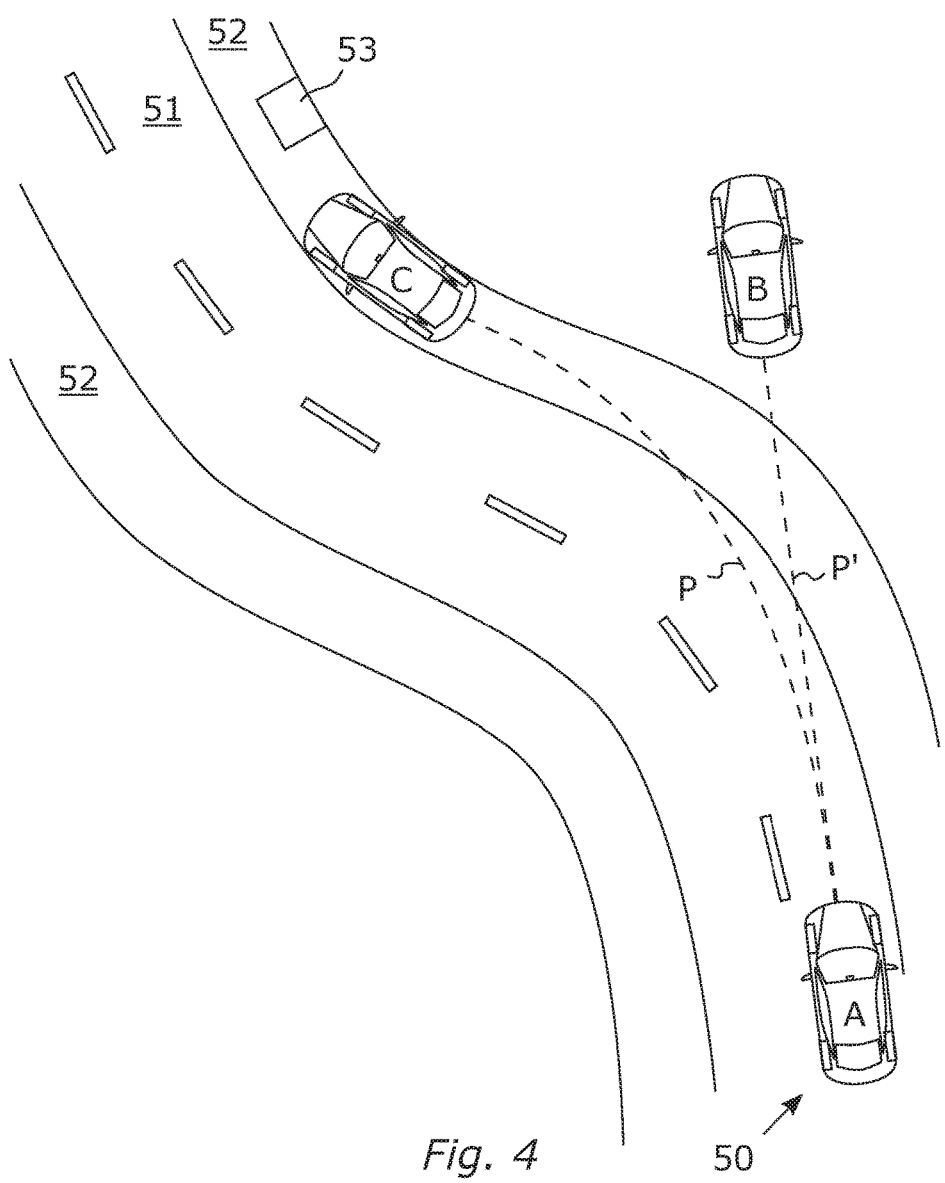
FIG. 4 illustrates the FIG. 3 vehicle in a road environment.

FIG. 4 illustrates the host vehicle 50 in a road environment. In position A it is determined, by the fault determination arrangement, the presence of a fault in the main steering system. If no action would be taken, i.e., if no response to the fault in the main steering system is initiated, the host vehicle 50 would most probably continue more or less straight ahead along path P' until departure of the road 51 or roadside 52. This is illustrated with position B.

In embodiments described herein the path controller is arranged to generate an upcoming path P for the host vehicle 50 based on information received from the sensors and/or information received via the communication arrangement. The path P can be referred to as an optimal path or preferred path, i.e., a path the host vehicle 50 can follow without departure from the road 51 and/or the roadside 52. In some situations the path controller can generate a path P which includes road and/or roadside departure if this is considered to be the best path. This may be the case e.g., if a surface next to the road 51 and/or roadside 52 is flat and free from obstacles.

The secondary steering system unit is arranged to steer the host vehicle 50 along the upcoming path P by activation of differential braking of at least one wheel brake upon determination that a fault is present in the main steering system. In FIG. 4 the host vehicle 50 is steered to position C on the roadside 52. The position C is considered to be a relatively safe position for the host vehicle 50 to stop. Due to the received or detected information on the host vehicle surrounding, moving or stationary objects 53 can be considered when the path P is generated.

Figure 5:
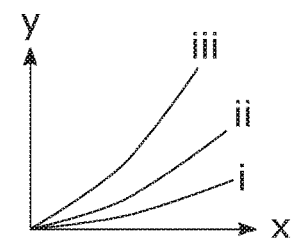
FIG. 5 illustrates graphs over host vehicle lateral displacement according to some embodiments.
Figure 5:
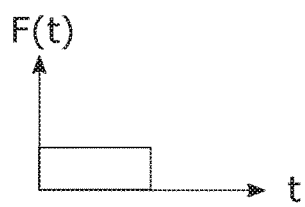

In the upper part of FIG. 5 is illustrated a possible lateral displacement for different scrub radiuses and in the lower part of FIG. 5 is brake force F(t) as a function on braking time t illustrated.

Curvature i corresponds to a negative scrub radius. This curvature is relatively modest, which means that a curvature of a path generated by the path generator cannot be larger than curve i with a negative scrub radius since the host vehicle cannot follow such a path. The scenario illustrated by the curve ii in FIG. 5 corresponds to a negative or very small scrub radius when a steering angle control arrangement 44 is used.

In embodiments with a wheel suspension where the scrub radius is positive and the magnitude is "sufficiently large" a relatively large curvature of the generated path can be followed by the host vehicle 50. The scrub radius affects the possibility for the host vehicle to follow the generated path. Since also other factors, such as wheel suspension design, affect the possibility for the host vehicle to follow the generated path, the magnitude of the scrub radius has to be designed and/or selected e.g., depending on the kind of wheel suspension the host vehicle is equipped with.

"Sufficiently large" for the scrub radius can thus be different for different host vehicles and/or wheel suspensions. In some embodiments the scrub radius should be large enough to be able to control the steering angle by braking one front wheel. In some embodiments a scrub radius which is at least 10 millimeters is sufficient for allowing the host vehicle to follow a desired number of generated paths. In some embodiment the scrub radius is at least 20 millimeters, and in some embodiments the scrub radius is at least 30 millimeters.

The curve iii in FIG. 5 illustrates a path which is possible to follow with a positive scrub radius. The host vehicle's side motion is then controlled by induced yaw torque and steering angle from braking inner wheel or wheels. This can give the largest curvature among the three examples above.

Figure 6A:
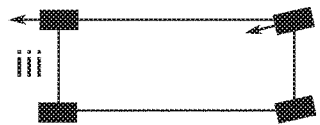
FIG. 6A illustrates differential braking according to some embodiments.

FIG. 6 illustrates the wheel angles corresponding to the curves i, ii and iii in FIG. 5. The wheel angle in FIG. 6A is a result of a positive scrub radius when the host vehicle is differentially braked, and causes the curve iii in FIG. 5. The wheel is forced to turn towards the differentially braked side. This is also referred to as toe-out effect.

Figure 6B:
FIG. 6B illustrates differential braking according to some other embodiments.
Figure 6C:
FIG. 6C illustrates differential braking according to yet some other embodiments.

FIG. 6B illustrates the host vehicle wheels when differentially braked and with a negative or very small scrub radius. In the 6B embodiment a spring and/or an elastic element is attached to the wheel suspension, forcing the wheels to not turn left or right. This scenario corresponds to curve ii of FIG. 5. FIG. 6C illustrates the host vehicle wheels when differentially braked and with a negative or very small scrub radius. This scenario corresponds to curve i of FIG. 5.

Figure 7:
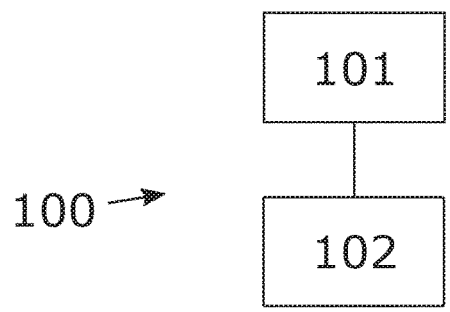
FIG. 7 illustrates a method for secondary steering of a host vehicle according to some embodiments.

FIG. 7 illustrates a method 100 for secondary steering of a host vehicle having autonomous steering capabilities, the host vehicle comprising a main steering system with a steering actuator for providing an overlay torque to the steering system which is sufficient to steer at least one pair of host vehicle steerable wheels. The host vehicle further has a brake system comprising a respective wheel brake associated with a respective vehicle wheel which is suspended by a respective wheel suspension.

The host vehicle comprises one or more sensors and a communication arrangement for acquiring vehicle surrounding information, the secondary steering system unit comprising a fault determination arrangement, arranged to determine the presence of a fault in the main steering system and a path controller. The path controller is arranged to generate an upcoming path for the host vehicle based on at least information received from the sensors and information received via the communication arrangement.

The secondary steering system unit is arranged to steer the host vehicle along the upcoming path by activation of differential braking of at least one wheel brake upon determination that a fault is present in the main steering system.

The method 100 comprises:
 steering 101, by the secondary steering system, the differential braking in dependence of a yaw torque acting on the host vehicle as a result of the differential braking and simultaneously,
 steering 102, by the secondary steering system, the differential braking in dependence of a steering angle resulting from a generated alignment torque on a braked steerable wheel caused by the associated wheel suspension scrub radius.

As one skilled in the art would understand, any of the above described systems, units, arrangements, etc. (e.g., secondary steering system unit 40, fault determination unit 41, path controller 42, navigation system, autonomous drive arrangement, communication unit, etc.) may include one or more processors (e.g., microprocessors, microcontrollers, programmable digital signal processors, or other programmable devices). Such components may also, or instead, include an application specific integrated circuit (ASIC), a programmable gate array or programmable array logic, a programmable logic device, or a digital signal processor (DSP). Where a component includes a programmable device such as a microprocessor, microcontroller or programmable digital signal processor, the component may further include a memory or storage for storing computer executable instructions (e.g., code) that are executable by the programmable device for controlling operation of the programmable device and for performing the particular algorithms represented by the functions and/or operations described herein.

While exemplary embodiments are described above, it is not intended that these embodiments describe all possible forms according to the disclosure. The words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A secondary steering system unit for a host vehicle having autonomous steering capabilities including a main steering system having a steering actuator for providing an overlay torque to the main steering system to steer at least one pair of host vehicle steerable wheels, the host vehicle further having a brake system including a respective wheel brake associated with a respective vehicle wheel that is suspended by a respective wheel suspension, the host vehicle further including one or more sensors and a communication arrangement for acquiring vehicle surrounding information, the secondary steering system unit comprising:
   a fault determination arrangement to determine a presence of a fault in the main steering system; and
   a path controller to generate an upcoming path for the host vehicle based on at least one of information received from the one or more sensors and information received via the communication arrangement;
   wherein the secondary steering system unit is operable to steer the host vehicle along the upcoming path by activation of differential braking of at least one wheel brake upon determination that a fault is present in the main steering system, and wherein the secondary steering system unit is operable to control the differential braking in dependence of both:
   a yaw torque acting on the host vehicle as a result of the differential braking and
   a steering angle resulting from a generated alignment torque on a braked steerable wheel caused by an associated wheel suspension scrub radius.

2. A secondary steering system comprising host vehicle wheels, wheel suspension, wheel brakes, and the secondary steering system unit according to claim 1.

3. The secondary steering system according to claim 2 wherein the scrub radius is positive.

4. The secondary steering system according to claim 3 wherein the scrub radius is at least 10 millimeters.

5. The secondary steering system according to claim 3 wherein the scrub radius is at least 20 millimeters.

6. The secondary steering system according to claim 3 wherein the scrub radius is at least 30 millimeters.

7. The secondary steering system according to claim 3 wherein the scrub radius is selected to cause a toe-out effect on a host vehicle wheel that is differentially braked.

8. The secondary steering system according to claim 2 wherein the wheel suspension comprises double wishbones.

9. The secondary steering system according to claim 2 wherein the scrub radius is negative or approximately zero.

10. The secondary steering system according to claim 9 further comprising a steering angle control arrangement configured to keep a current steering wheel angle during differential braking.

11. The secondary steering system according to claim 8 wherein the steering angle control arrangement comprises at least one of a friction element and a spring configured to keep the current steering wheel angle during differential braking.

12. A vehicle comprising a secondary steering system unit according to claim 1.

13. A vehicle comprising a secondary steering system according to claim 2.

14. A method for secondary steering of a host vehicle by a secondary steering system, wherein the host vehicle has autonomous steering capabilities and includes a main steering system with a steering actuator for providing an overlay torque to the main steering system to steer at least one pair of host vehicle steerable wheels, the host vehicle further having a brake system including a respective wheel brake associated with a respective vehicle wheel that is suspended by a respective wheel suspension, the host vehicle further including one or more sensors and a communication arrangement for acquiring vehicle surrounding information, the secondary steering system including a fault determination arrangement configured to determine a presence of a fault in the main steering system and a path controller configured to generate an upcoming path for the host vehicle based on at least one of information received from the one or more sensors and information received via the communication arrangement, the secondary steering system being operable to steer the host vehicle along the upcoming path by activation of differential braking of at least one wheel brake upon determination that a fault is present in the main steering system, the method comprising:
   controlling, by the secondary steering system, the differential braking in dependence of a yaw torque acting on the host vehicle as a result of the differential braking; and
   simultaneously controlling, by the secondary steering system, the differential braking in dependence of a steering angle resulting from a generated alignment torque on a braked steerable wheel caused by an associated wheel suspension scrub radius.

15. A method for secondary steering of a host vehicle by a secondary steering system, wherein the host vehicle has autonomous steering capabilities and includes a main steering system with a steering actuator for providing an overlay torque to the main steering system to steer at least one pair of host vehicle steerable wheels, the host vehicle further having a brake system including a respective wheel brake associated with a respective vehicle wheel that is suspended by a respective wheel suspension, the host vehicle further including one or more sensors and a communication arrangement for acquiring vehicle surrounding information, the method comprising:
   determining, by a fault determination arrangement of the secondary steering system, a presence of a fault in the main steering system;
   generating, by a path controller of the secondary steering system, an upcoming path for the host vehicle based on at least one of information received from the one or more sensors and information received via the communication arrangement;
   steering, by the secondary steering system, the host vehicle along the upcoming path by activation of differential braking of at least one wheel brake upon determination that a fault is present in the main steering system; and
   controlling, by the secondary steering system, the differential braking based on: 1) a yaw torque acting on the host vehicle as a result of the differential braking and 2) a steering angle resulting from a generated alignment torque on a braked steerable wheel caused by an associated wheel suspension scrub radius.

* * * * *